United States Patent [19]
Bischoff

[11] Patent Number: 4,737,269
[45] Date of Patent: Apr. 12, 1988

[54] CATALYST LOADING HOPPER

[75] Inventor: Michael E. Bischoff, Fairfield, Calif.

[73] Assignee: Catalyst Technology, Inc., Buckner, Ky.

[21] Appl. No.: 863,469

[22] Filed: May 15, 1986

[51] Int. Cl.$^4$ .......................... B07B 9/00; B65G 69/12
[52] U.S. Cl. ........................................ 209/23; 209/27; 209/137; 209/235; 209/352; 414/146; 414/291
[58] Field of Search .................. 209/21, 22, 23, 26, 209/27, 30, 31, 133, 136, 137, 235, 236, 240, 352, 356; 414/160, 148, 190, 208, 287, 288, 291, 293, 299; 422/216, 219, 232

[56] References Cited

U.S. PATENT DOCUMENTS

| | | | |
|---|---|---|---|
| 251,883 | 1/1882 | Holmes | 209/356 X |
| 818,944 | 4/1906 | Eaches | 209/356 X |
| 2,444,258 | 6/1948 | Johnson | 209/233 X |
| 3,409,126 | 11/1968 | Kennedy, Jr. | 209/240 X |
| 3,409,411 | 11/1968 | Mosley et al. | 209/23 X |
| 3,662,886 | 5/1972 | Kennedy, Jr. | 209/30 X |
| 3,719,276 | 3/1973 | Allen et al. | 209/240 |
| 3,908,720 | 9/1975 | Garnett | 209/23 X |
| 3,948,764 | 4/1976 | Edwards | 209/30 |
| 4,000,061 | 12/1976 | Bowling et al. | 209/240 X |
| 4,247,240 | 1/1981 | Schora, Jr. et al. | 422/219 X |

FOREIGN PATENT DOCUMENTS

| | | | |
|---|---|---|---|
| 0036181 | 8/1935 | Netherlands | 209/22 |
| 0080511 | 7/1952 | Norway | 209/22 |

Primary Examiner—Robert B. Reeves
Assistant Examiner—Edward M. Wacyra
Attorney, Agent, or Firm—William R. Price

[57] ABSTRACT

A catalyst loading hopper suitable for positioning in vertical position above a reactor vessel, having an inlet at its upper end, a catalyst outlet at its lower end and a diagonally-disposed baffle extending downwardly across the hopper but terminating short of one of the walls of the hopper and a weir adjustably arranged so as to control the flow of catalysts through the hopper. There is a dust outlet at the top of the hopper, which may be connected to a conduit so as to draw dust away from the upper end of the hopper and a screen at the bottom of the hopper to separate the catalyst from any fines or undersized catalyst particles. The screen feeds into a catalyst outlet which, in turn, feeds into a conduit, which extends into the reactor vessel so as to allow arrangement of the cleaned catalyst pellets in layers in the vessel. A gas nozzle opens in the wall of the hopper and allows dust to be blown from the catalyst pellets and through the dust outlet to be collected in a suitable filter. The fines and undersized catalyst portions can be drawn through a fines outlet and conduit to a suitable receptacle.

13 Claims, 5 Drawing Sheets

CATALYST LOADING HOPPER

The present invention is directed to an apparatus for separating dust and fines, as well as undersized catalyst pieces from solid catalyst pellets. More particularly, the invention is concerned with removing dust, fines and undersized catalyst pellets from uniform size catalyst pellets upon loading of the catalyst into a reactor vessel.

FIELD OF THE INVENTION

This invention falls into the field of separation of dust and undersized particles and fines from catalysts as well as to the art of loading catalysts into reactor vessels. More specifically, this invention relates to an apparatus which fits outside of the reactor vessel but allows the catalyst to be fed at a uniform rate into the reactor vessel while simultaneously separating dust from the catalyst pellets as well as fines and undersized particles from the catalyst pellets.

BACKGROUND OF THE INVENTION

Catalysts are sieved before they are packed into drums to be shipped to their destination. Nevertheless, some attrition occurs in transit, particularly if the drums are roughly handled. As a consequence, some form of screening is usual before charging the catalyst to the reactor vessels. One method of screening which has been utilized in the prior art is to pass the catalyst over an inclined chute made of a suitably-sized mesh. Other methods have included passing the catalyst over vibrating screens. The former method quite often is more satisfactory since vibrating screens can cause further unnecessary fragmentation and loss of catalyst. Another useful method is to blow the dust away with a compressed air jet while the catalyst is pouring into a charging bucket or hopper. Simple hand sieving may be used. However, the operators must stop sieving when the dust has been removed, so that unnecessary attrition is avoided.

In charging the catalyst into the reactor vessels, the catalyst should not have a free fall of more than two to three feet and the catalyst must be distributed evenly as the catalyst bed is filled. The catalyst pellets should not all be poured into the vessel in one spot and subsequently raked level. When this is done, the particles tend to segregate, with small particles and dust remaining in the center of the heap, while the larger pieces roll to the edge. Uneven packing and breakage during charging seriously affects the gas distribution utilization of the catalyst. The degree of packing in the catalyst bed has a marked effect on the voidage so that in a bed of regularsize pellets, the voidage can vary by over $\pm 10\%$, according to the degree of packing. If the granules are not all the same size or if fines or undersized catalyst pieces are present, the voidage variations can be considerably greater. The effect of packing on pressure drop is even more marked because the pressure drop is roughly proportional to voidage. Thus, the difference in the pressure drop between loosely packed and closely packed beds of regularsize pellets is roughly in the ratio of about 1:2. In practice, the pressure drop increases by about 50% when the catalyst bed settles during use.

DESCRIPTION OF THE PRIOR ART

One of the quickest ways of filling a vessel evenly is with a canvas tube or sock fitted to a hopper, which is supported outside of the manhole. The sock is kept full of catalyst pellets and raised slowly to allow the catalyst pellets to flow into the vessel in a controlled manner. The sock must be guided in some way so that it always discharges at the same point to avoid kinking. A metal tube has the advantage of being more easily steered and can be used with more abrasive-type agents. The tube is usually made in flanged sections, which can be removed as the vessel is filled and a shorter tube is needed. When operators have to enter the vessel during or after charging, planks or specially-designed shoes must be used so that the men do not step directly on the catalyst. Most catalysts produce dust in the vessel during the charging process and, as a consequence, dust masks must be provided to anyone who has to enter. Protection against the dust is particularly important if the catalyst has any toxic properties, as is the case of high-temperature water-gas shift catalysts containing chromium oxide or of phosphoric acid catalysts containing free phosphoric acid. In some cases, if the catalyst bed is wide and access is through a side manhole, it can be difficult to distribute the catalyst without raking. A small conveyor, narrow enough to fit through the manhole and long enough to reach across the vessel, has been utilized. A vessel may be charged by the rope and bucket method, which involves a man standing on a plank inside the vessel to empty the bucket of catalyst pellets onto the catalyst bed. Alternately, a double rope system may be employed so that the bucket can be tipped at the appropriate moment from the outside. There are some buckets with opening bottoms somewhat akin to a clam shell. In some cases, the catalyst drums themselves can be lowered and emptied into the vessel. This cuts out one handling stage, but it also eliminates the chance of screening the catalyst before charging. Mosley, in U.S. Pat. No. 3,409,411, provided a loading vessel, having an air inlet and a suction or low pressure line attached to a fines outlet so that the unit could be attached to a vacuum pump and the fines removed by a filtration device. The catalyst pellets in this instance were loaded through a catalyst hopper or funnel at the top so that the problem of dust evolution upon loading was not solved. The problem of the removal of fines and undersized particles was eliminated however through the use of Mosley's loading apparatus.

SUMMARY OF THE INVENTION

According to the present invention, the catalysts can be loaded directly into a hopper and the dust can be removed through a conduit at the top, connected to a low pressure line. Simultaneously, the catalyst, by means of a baffle and weir arrangement can be fed slowly across the baffle onto a screen so that the undersized particles and fines fall through the screen into a tray below while the full-size pellets fall into a conduit going directly into the reaction vessel. Workers in the reaction vessel, supported on planks, or wearing specially-designed shoes, can then evenly distribute the catalyst pellets in the catalyst bed, so as to eliminate voidages and to accentuate uniform packing across the entire bed. The fines and undersized particles which have been screened out from the full-size pellets can be separated either by gravity or through a conduit connected to a suction pump or low pressure means and recovered in proper receptacles. Accordingly, the dust problem is eliminated, the problem of undersized particles and fines is eliminated and the catalyst pellet loading technique is proper in that the catalyst pellets do not fall more than a few feet and are evenly distributed across the entire catalyst bed.

DESCRIPTION OF THE PREFERRED EMBODIMENT

As previously mentioned, the effect of packing variations on the distribution of gas flow through a catalytic reactor vessel is quite important. Voidage involves more than the effect on pressure drop. Thus, for example, if two identical reactors in parallel are packed to the same depth but with different voidages, so that one of them has a voidage 20% higher than that of the other, the ratio of gas flow in such a system becomes proportional to the sixth power of the ratio of the voidage. Therefore, more than 75% of the gas passes through one reactor vessel, thus increasing the space velocity to over 150% of the design value. The remaining gas flows through the other parallel converter at less than 50% of the design space velocity. In practice, maldistribution of packing may occur when all of the catalyst is allowed to fall in one part of the bed, just beneath the charging manhole and is thereafter leveled across the catalyst bed by means of a rake. Another maldistribution occurs when operators walk on the catalyst bed without proper shoes or support planks. Variations in voidages occur due to catalyst spalling, breakage or excessive fragmentation and dusting.

Another danger of irregular packing and uneven gas flow arises in reactors which depend on the flow of gas to control the temperature of the bed. High local temperatures occur in regions of low flow so that the reaction may proceed further than desired, thus deactivating the catalyst or possibly leading to a runaway reaction.

Figure 1:
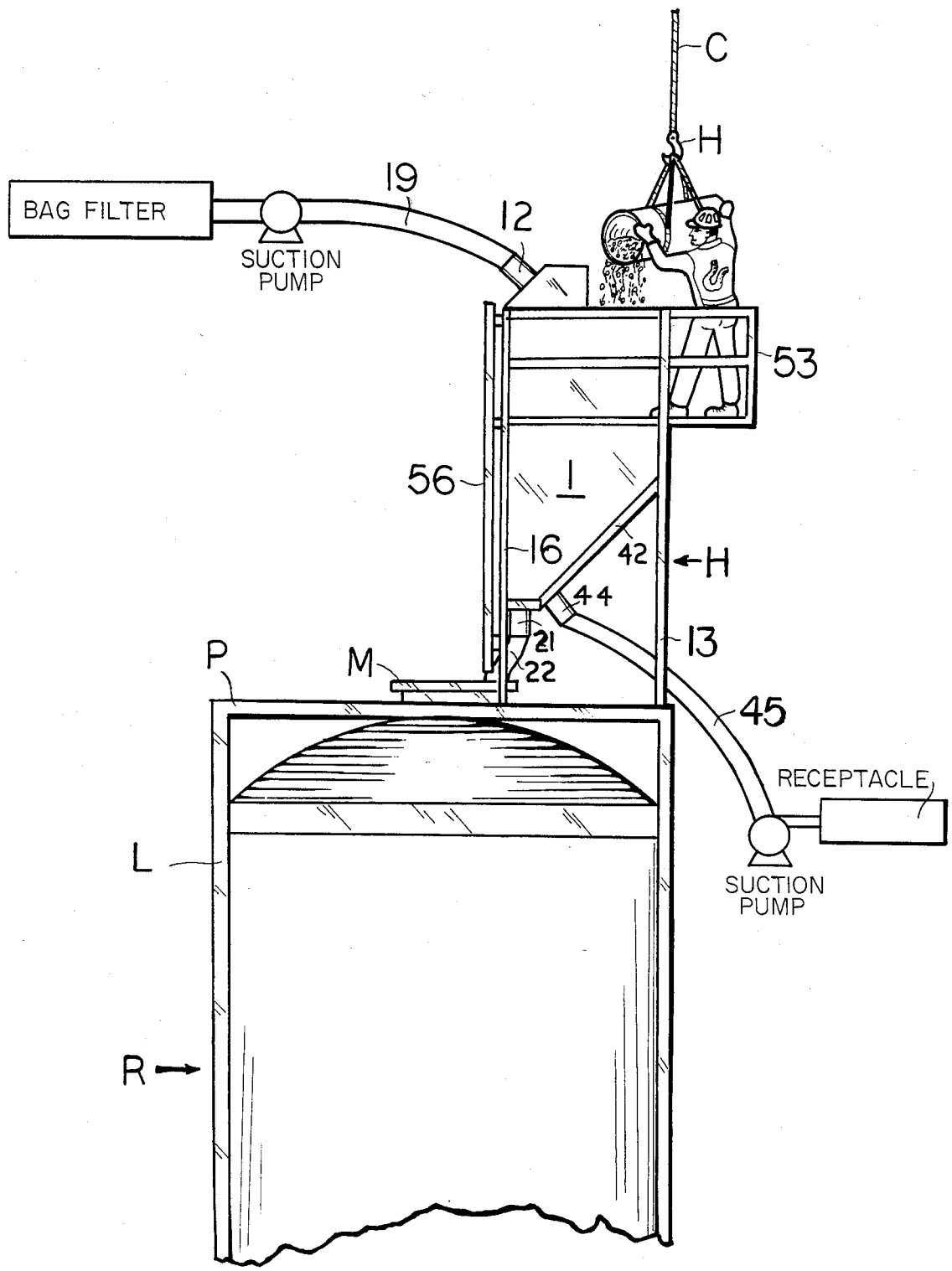
FIG. 1 is a fragmentary side elevational view, illustrating the apparatus of this invention in position on a reaction vessel.
Figure 2:
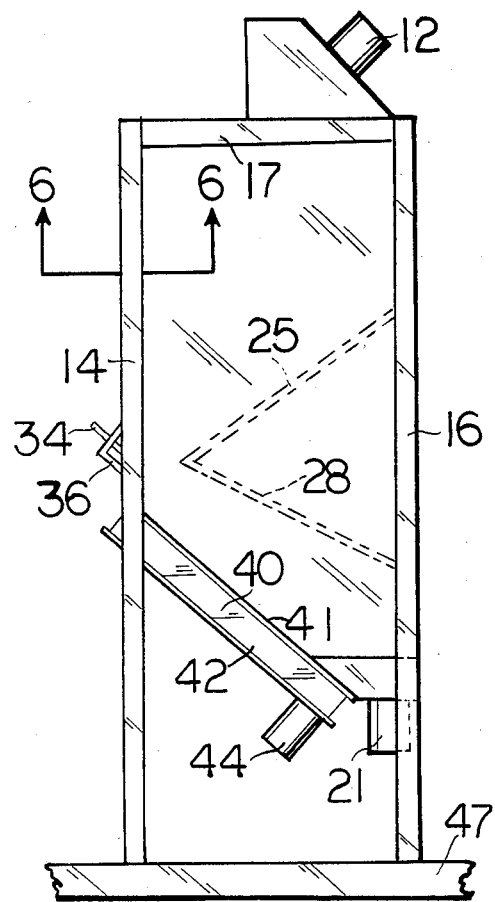
FIG. 2 is a side elevational view, with portions broken away, of the apparatus of this invention.

Referring now to the drawings, and particularly to FIG. 1, the hopper is shown in position on top of reactor R and directly over the top manhole M.

Figure 3:
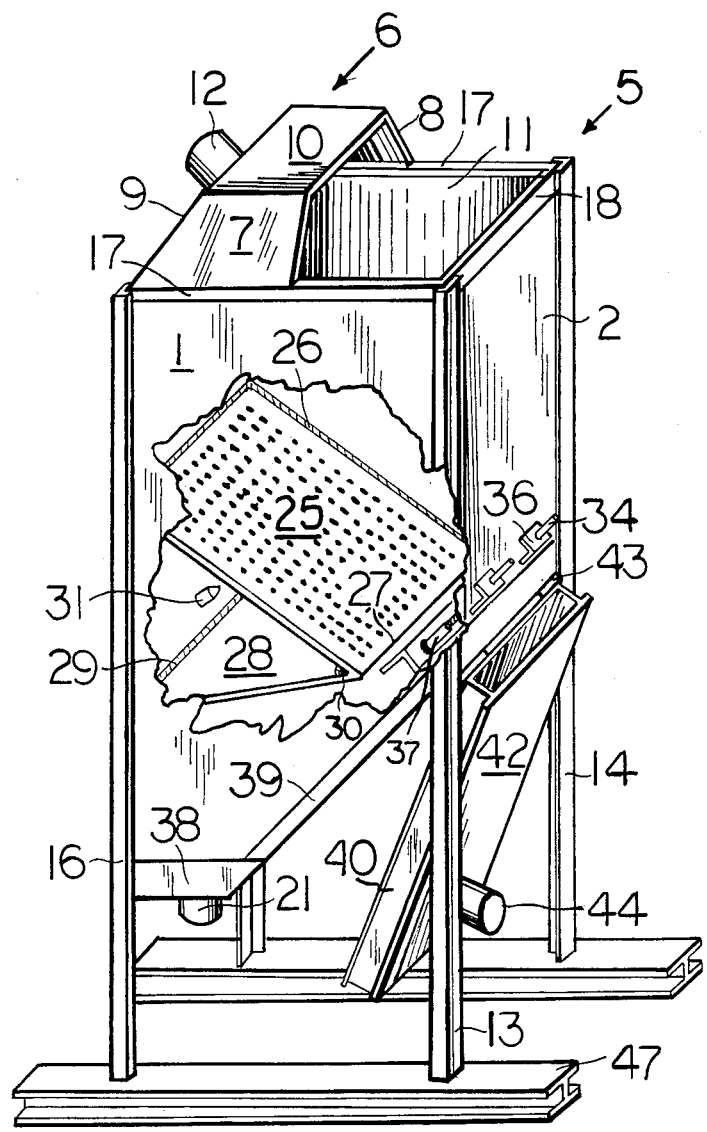
FIG. 3 is an isometric view, with portions broken away, illustrating the interior portions of the hopper of this invention.
Figure 4:
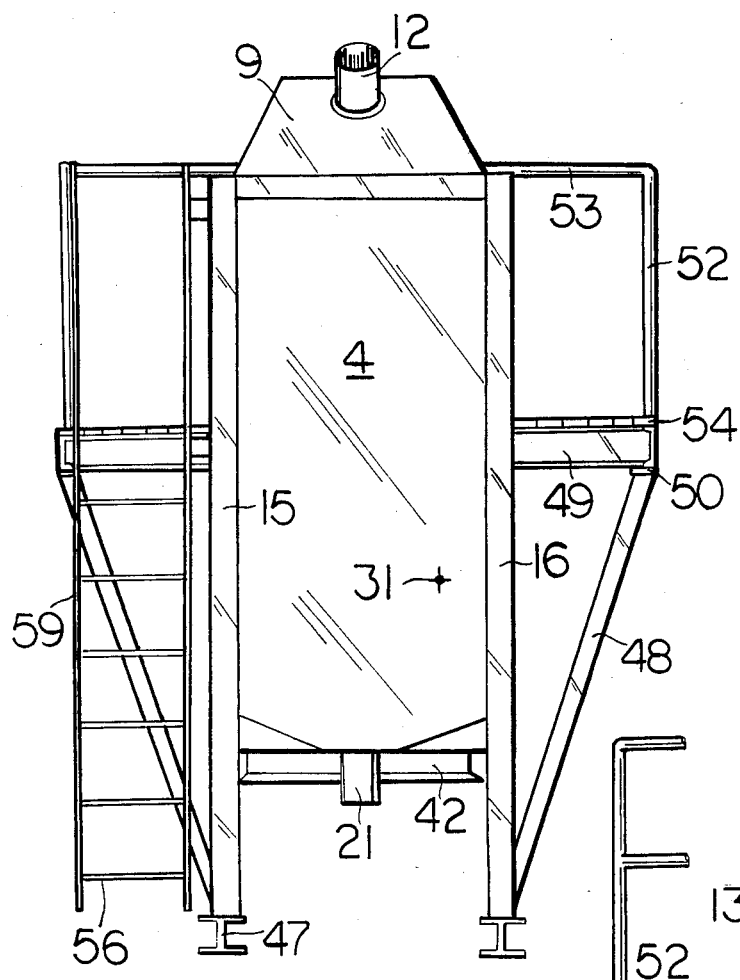
FIG. 4 is a frontal view illustrating the hopper of this invention.
Figure 5:
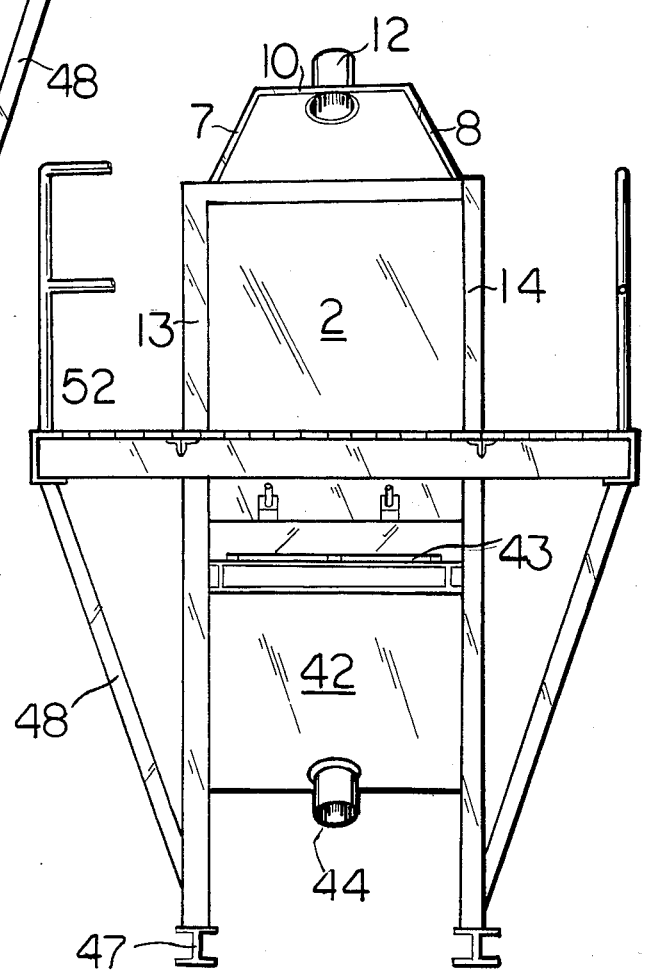
FIG. 5 is a rear view, with portions broken away, illustrating the hopper of this invention.
Figure 6:
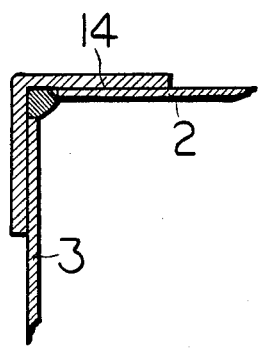
FIG. 6 is a sectional view, taken along lines 6-6 of FIG. 2.
Figure 7:
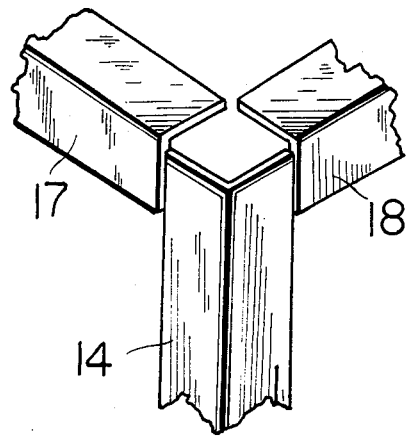
FIG. 7 is an exploded, fragmentary, isometric view of the frame of the catalyst inlet of this invention.

As is shown in the drawings, the hopper per se consists of four vertical walls 1-4. Upper end 5 has a hood 6 comprising two side walls 7 and 8 and a tapered end wall 9. The top 10 of the hood 6 terminates so that the catalyst inlet 11 occupies the remainder of the upper end 5 of the hopper. Frame members 17 and 18 reinforce the upper end 5 of hopper H and cooperate with angle iron legs 13-16 at each corner as is shown in FIGS. 3 and 7. The dust outlet 12, in the form of a tube, extends from the tapered end wall 9 and is arranged so as to be connected to a low-pressure conduit 19, which may be connected to a vacuum pump or fan, which, in turn, may be connected to a filtration device, such as a bag filter for collecting any dust which may be generated in pouring the catalyst from the drums or from the bags through the catalyst inlet 11. The hopper is supported by means of legs 13, 14, 15 and 16, which are in the form of angle irons and the side walls 1 2, 3 and 4 are welded to the angle iron legs as is shown in FIG. 6.

The catalyst outlet 21 at the bottom of the hopper H is connected to a conduit 22, which, as is shown, feeds through the manhole M into the reactor R, so that the men within the reactor vessel R, standing on planks or other protective devices, can evenly distribute the catalyst pellets across the catalyst bed with a minimum of free fall drop.

As the catalyst pellets are fed from the drum or bag through the catalyst inlet 11, the catalyst pellets fall onto the perforated baffle 25, which extends diagonally downwardly across the hopper. Baffle 25 is welded by welds 26 to walls 3 and 4. The terminal edge 27 of baffle 25 falls short of reaching the vertical wall 2, so that the catalyst pellets can flow across the baffle and onto the screen 41 disposed on tray 42 below. As is shown, the terminal edge 27 of the baffle is welded by weld 30 to steel plate 28 which, in turn, is welded with welds 29 to the walls 3 and 4 of the hopper. A gas nozzle 31 is disposed in the wall 4 below the perforated baffle 25, but above the solid steel plate 28. Thus, gas flows from the gas nozzle through the perforated plate 25 and across the catalyst pellets traversing the perforated baffle 25. This gas and dust separated from the catalyst pellets are drawn through dust outlet 12, connected to low-pressure conduit 19. Conduit 19 may be in communication with a lowpressure means, such as a fan or suction pump and to a bag filter or other filtration device. Thus, any dust which has been formed in the catalyst drum during shipment, or which is generated in pouring the catalyst across the baffle 25, is removed immediately from the hopper through the dust outlet 12 and through low pressure conduit 23 connected to catalyst delivery conduit 19 to the suction pump and to the filtration device. The catalyst pellets flowing across the baffle, flow past the terminal edge 27 and onto the screen 41, which is supported by a frame made up of channel members 40 at the bottom of the hopper. The fines and the undersized pieces then fall through the mesh screen so that only the full-size, dust-free catalyst pellets fall into the catalyst outlet 21 and are fed in through the catalyst conduit 22 into the reactor vessel R.

In order to control the flow of catalyst through the hopper and to make variations according to various catalyst sizes or shapes, a weir member 33 is provided, supported on an angle iron guide 32, which is welded to the walls 1 and 3 of the reactor. A sleeve 37 is welded to the weir plate 33 by weld 35. Bolt 34 in sleeve 37 extends through bracket 36. Thus, by turning the bolt 34 on the outside of the hopper wall, it is possible to move the weir member relative to the terminal edge 27 of baffle 25, so as to compensate for different size catalyst pellets.

The frame members 38, 39 surrounding the base portion of the walls 1, 2, 3 and 4, act as a support for a frame made of channel members 42 and containing screen 41 and the tray 42. The channel members are suspended from the frame member 39 by means of the hinge 43 so that the tray 42 can be lowered and cleaned out, should the fines build up. Basically, however, the fines are removed through the fines outlet 44, which is connected to a conduit 45, which may feed by gravity to a receptacle (not shown) or which may feed to another suction pump or fan to form a zone of low pressure through a filtration device or the like.

Figure 8:
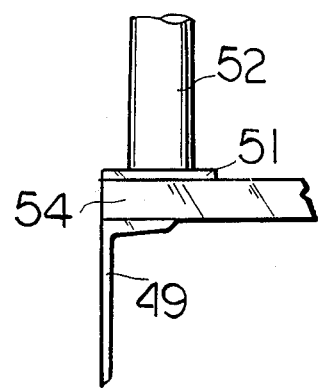
FIG. 8 is an exploded, fragmentary view of the hand rail and grating members of this invention.
Figure 9:
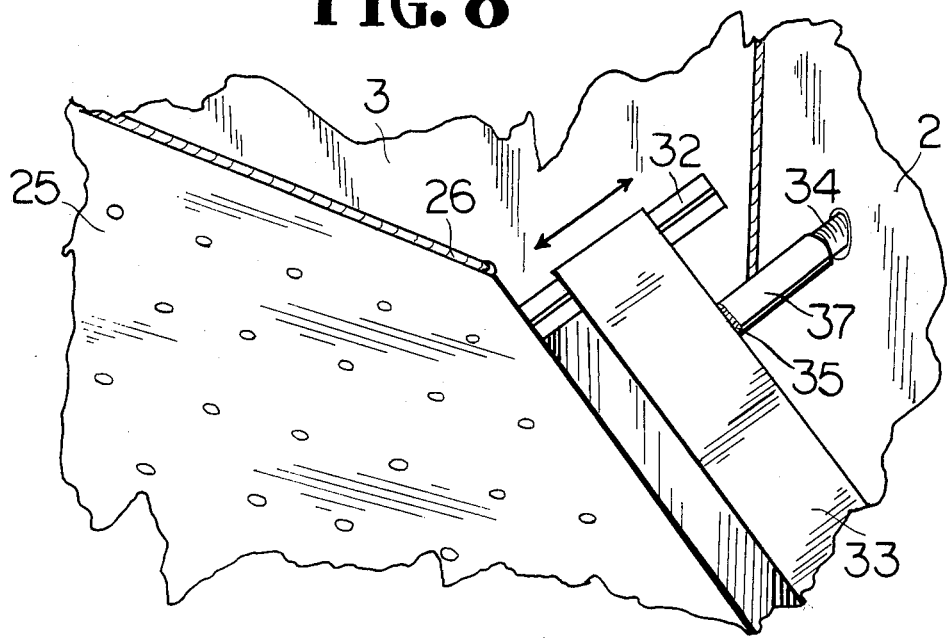
FIG. 9 is an exploded, fragmentary view of the weir and weir adjustment means used in controlling the flow of catalyst pellets across the perforated baffle of the hopper of this invention.

As is shown, the legs 13, 14, 15 and 16 are supported on I beams 47, which, in turn, are supported on the platform P. Platform P has legs L extending around the top of the reactor vessel R. Truss members 48 extend from legs 13 and 14 diagonally to support channel member 49 by means of plate 50. Plate 51 is utilized as a base for upstanding post 52, which is connected to a banister or side hand rail 53 which extends around the periphery of the hopper proper. The grating 54, supported by channel member 49, is illustrated in some detail in FIG. 8. A ladder 56, consisting of vertical side rails 59 and treads 57, is attached by means of brace 58 to the hopper H proper and allows access to and from the walkway formed by the grating 54 and the banister 53 supported by the vertical post 52.

This allows a man to climb up to the top of the hopper to feed the hopper and control the flow of catalyst pellets through the baffle 25 and onto the screen 41 through the catalyst outlet 21 through the catalyst feed conduit 22 to workmen in the reactor R proper.

It should be noted that the gas nozzle 31 is provided so as to allow air or other gases to be directed into the hopper. Thus, it is possible, in case of reduced catalysts, to evacuate all of the oxygen-containing air from the hopper and blanket the catalyst being loaded with nitrogen or other inert gases. Additionally, it is possible to utilize mildly oxidizing gases, such as $CO_2$ in loading the catalyst into the reactor.

The solid plate 28 seals the flow of gas from the gas nozzle 31 from going out through the fines outlet or through the catalyst outlet, but is drawn through the lowpressure suction means through the dust outlet 12 at the top of the reactor. The catalyst inlet 11 can be closed by means of the loading device, such as a bag or drum fitting over the top of the catalyst inlet 11 to eliminate air or moisture from entering the loading hopper while the catalyst is being loaded.

This then eliminates oxidation of previously reduced and stabilized catalysts, the wetting of hygroscopic catalysts, such as those containing large concentrations of alkali, or the elimination of any undesirable contaminant from the atmosphere. It is possible, therefore, as a consequence, to control the atmosphere in the hopper, to control the rate of flow of catalysts across the baffle, to remove the dust from the catalyst prior to being loaded to the reactor and simultaneously to remove the fines and undersized catalyst pieces from the bottom through the screen 41 provided at the bottom of the reactor. Additionally, by use of the catalyst loading conduit 22, the free drop of the catalyst onto the catalyst bed can be closely controlled so that the catalyst packing in the catalyst bed is uniform, thus eliminating excessive pressure drops, excessive voidages and the attendant problems which have previously been outlined.

Figure 10:
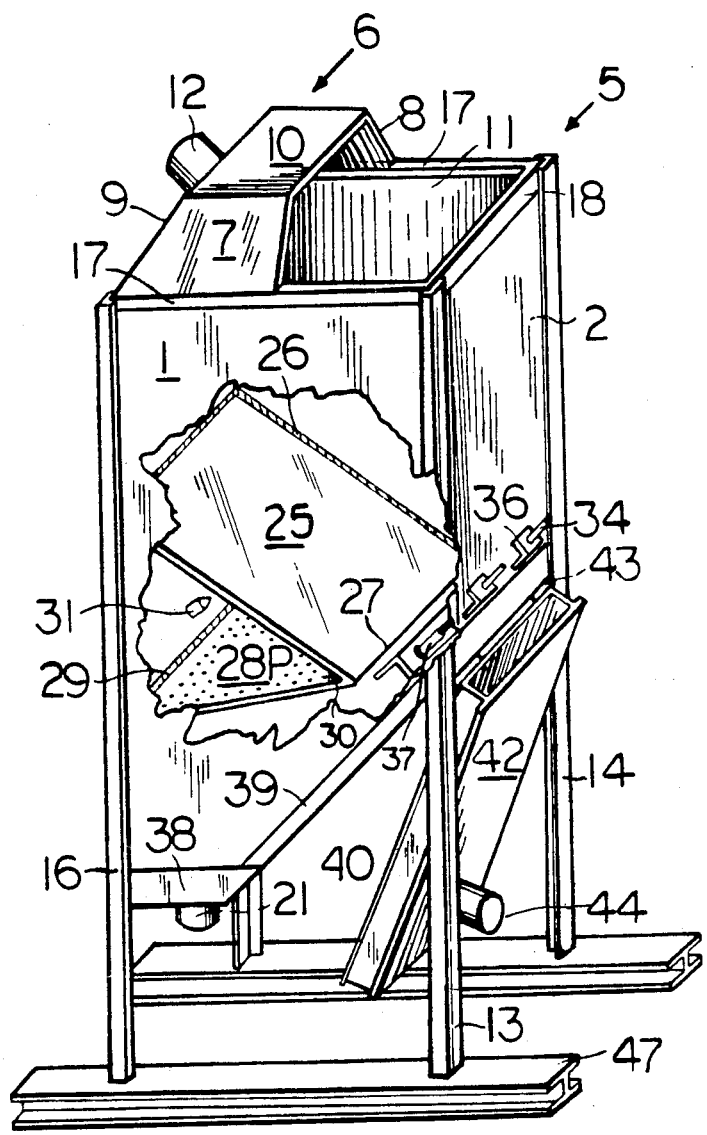
FIG. 10 is an isometric view, with portions broken away, illustrating another embodiment of this invention.

In the embodiment shown in FIG. 10, the plate or baffle arrangement has been reversed. In this embodiment, plate 25 is solid and plate 28 P is perforated. Gases flowing through nozzle 31 enter the space formed by solid plate 25 and perforated plate 28 P. This space is sealed along the sides and ends by welds 29 and 30. These gases then are distributed through the gas distribution plate 28 P so as to be distributed in the area above the screen 41 and thus be drawn through the conduits 12 and 44 to a proper receptacle.

Many modifications will occur to those persons skilled in the art from the detailed description hereinabove given. This description is meant to be exemplary in nature and nonlimiting except so as to be commensurate in scope with the appended claims.

I claim:

1. Apparatus for separating dust and fines from solid catalyst pellets and for loading said catalyst pellets into a catalytic reactor, which comprises:
   A. a hopper, suitable for arrangement in vertical position above said reactor, which comprises:
      1. four vertical walls, an upper end and a lower end;
      2. an inlet means at said upper end for reception of solid catalyst pellets;
      3. a catalyst outlet at said lower end;
      4. a first diagonally-disposed baffle attached to three of said vertical walls and extending downwardly across said hopper but terminating short of the fourth vertical wall;
      5. a gas nozzle opening in the wall of said hopper, below the level of said diagonally-disposed baffle for introducing gas into said hopper;
      6. a dust outlet at the upper end of said hopper;
      7. a screen disposed diagonally and downwardly across the lower end of said hopper and feeding into said catalyst outlet;
      8. a tray located beneath said screen for receiving fines and undersized catalyst pellets falling through said screen;
      9. a fines outlet in said tray; and
   B. a first conduit connectable to said catalyst outlet and extending into the reactor for loading catalyst pellets in layers within said reactor;
   C. a second conduit connectable to said dust outlet for drawing off dust from the upper end of said hopper; and
   D. a pressure reduction means located outside of said hopper and connected to said second conduit.

2. Apparatus, as defined in claim 1, which includes a receptacle for receipt of fines and undersized catalyst pellets from said fines outlet.

3. Apparatus, as defined in claim 2, which includes a third conduit, connectable to said fines outlet and which communicates with said receptacle.

4. Apparatus, as defined in claim 3, in which said third conduit is connected to a pressure reduction means located between said hopper and said receptacle.

5. Apparatus, as defined in claim 1, in which said first diagonally-disposed baffle is a perforated steel plate.

6. Apparatus, as defined in claim 1, which includes a plate joined to the lower end of said diagonally-disposed baffle and to three of the four vertical walls.

7. Apparatus, as defined in claim 6, in which said gas nozzle opens into the wall above said plate.

8. Apparatus, as defined in claim 6, in which said plate is perforated.

9. Apparatus, as defined in claim 8, in which said baffle is in the form of a solid steel plate.

10. Apparatus, as defined in claim 8, in which said gas nozzle opens into the wall below said baffle.

11. Apparatus, as defined in claim 1, which includes a weir, located near the bottom edge of said first diagonally disposed baffle for governing the flow of catalyst pellets through the hopper.

12. Apparatus, as defined in claim 11, which includes adjustable means for said weir, whereby the relationship of the weir to said baffle can be adjusted.

13. Apparatus, as defined in claim 1, which includes a hinge connected to the lower part of said hopper and to said tray.

* * * * *